United States Patent
Black et al.

(10) Patent No.: US 7,634,682 B2
(45) Date of Patent: Dec. 15, 2009

(54) METHOD AND SYSTEM FOR MONITORING NETWORK HEALTH

(75) Inventors: Chuck A. Black, Roseville, CA (US); Daniel E. Ford, Roseville, CA (US); Jeffrey A. LaBarge, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 370 days.

(21) Appl. No.: 11/590,038

(22) Filed: Oct. 30, 2006

(65) Prior Publication Data

US 2008/0155327 A1   Jun. 26, 2008

(51) Int. Cl.
   *G06F 11/00* (2006.01)
(52) U.S. Cl. .................. 714/4; 714/27; 709/224
(58) Field of Classification Search ............... None
   See application file for complete search history.

(56) References Cited

U.S. PATENT DOCUMENTS

| | | | |
|---|---|---|---|
| 7,197,561 B1 * | 3/2007 | Lovy et al. ............. | 709/224 |
| 7,389,347 B2 * | 6/2008 | Brodie et al. .......... | 709/224 |
| 2001/0056486 A1 * | 12/2001 | Kosaka ................ | 709/224 |
| 2002/0152303 A1 * | 10/2002 | Dispensa ............. | 709/224 |
| 2004/0054680 A1 * | 3/2004 | Kelley et al. .......... | 707/100 |
| 2005/0053009 A1 * | 3/2005 | Denby et al. .......... | 370/250 |
| 2005/0144531 A1 * | 6/2005 | Challener et al. ...... | 714/39 |
| 2005/0219151 A1 * | 10/2005 | Li et al. ............... | 345/7 |
| 2005/0223091 A1 * | 10/2005 | Zahavi et al. ......... | 709/224 |
| 2005/0223264 A1 * | 10/2005 | Arden et al. .......... | 714/4 |
| 2005/0235057 A1 * | 10/2005 | Brodie et al. .......... | 709/224 |
| 2008/0025223 A1 * | 1/2008 | Karacali-Akyamac et al. ................ | 370/241 |
| 2008/0133288 A1 * | 6/2008 | Thibaux et al. ........ | 705/7 |
| 2008/0209269 A1 * | 8/2008 | Brodie et al. .......... | 714/26 |
| 2008/0320135 A1 * | 12/2008 | Challener et al. ...... | 709/224 |

\* cited by examiner

*Primary Examiner*—Christopher S McCarthy (57) ABSTRACT

A method and system for monitoring a characteristic relating to real-time network health are described. The method includes detecting a functionality attribute of a service application accessed with a server of the network. Networking devices of the network are interrogated in relation to an operational status thereof. The real-time network health characteristic is inferred from the functionality attribute and/or the operational status detected.

20 Claims, 7 Drawing Sheets

Exemplary Process for Monitoring Network Health 70

METHOD AND SYSTEM FOR MONITORING NETWORK HEALTH

TECHNOLOGY

The present invention relates generally to networks. More specifically, embodiments of the present invention relate to methods and systems for monitoring network health.

BACKGROUND

Networks are useful in a number of modern fields. Networks and services (e.g., applications) based therein (e.g., network services) are widely used in many modern endeavors and entities and can be important to an operation thereof. Network health can thus be significant in such fields. Network health relates to a network's ability to interconnect and exchange information between computers, communication media, etc. networked therewith and thus, to a functional ability of a network to effectively provide network services.

Factors that comprise significant network health related characteristics include the effectiveness, functionality and efficiency of network services and network reliability, and availability. Network health characteristics characterize operational network reliability and how well network services can be used and is subject to a number of influences from various sources. Monitoring the network health-related influences can be a significant network management (e.g., network administration, etc.) task. To monitor these network health related influences, information related thereto must be gathered.

One conventional approach to monitoring network health related influences is the collection and analysis of data from network devices such as routers, network switches, etc. Such device related information is useful for determining network connectivity, reliability, efficiency, and the like. However, this device related data are related only indirectly, and in some cases perhaps marginally, to network services. Further, such data must be organized and tabulated, which adds latency. This latency can limit the relevance of these data to real-time network health monitoring.

The latency can also affect user and network management convenience. Rather than aggressively monitoring network health characteristics in real-time, which could for instance allow proactive network health management, network administrators and other network management entities may typically learn of network health related issues upon receipt of notification that a network user is experiencing a problem such as a network services application running sub-optimally on a server.

Another conventional approach monitors network services and displays health related information associated therewith, such as that a service is operational or not. However, where networking issues outside the purview of the network services impacts the usefulness and functionality thereof, such as where an off line router or other network anomaly creates a bottleneck in network traffic, conventional network services health applications remain unaware of the root of the problem.

SUMMARY

A method and system for monitoring a characteristic relating to real-time network health are disclosed. The method includes detecting a functionality attribute of a service application associated a server of the network. Networking devices of the network are interrogated in relation to an operational status thereof. The real-time network health characteristic is inferred from the functionality attribute and/or the operational status detected.

BRIEF DESCRIPTION OF THE DRAWINGS

The accompanying drawings, which are incorporated in and form a part of this specification, illustrate exemplary embodiments of the present invention and, together with the description, serve to explain the principles of the invention. Unless specifically noted, the drawings referred to in this description are not drawn to scale.

DETAILED DESCRIPTION

Exemplary embodiments of methods and systems for monitoring a characteristic relating to real-time network health are described herein. Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims.

Furthermore, in the detailed description of exemplary embodiments below, numerous specific details are set forth in order to provide a thorough understanding of the present invention. However, one of ordinary skill in the art will realize that embodiments of the present invention may be practiced without these specific details. In other instances, well-known networks, devices, methods, systems, processes, procedures, components, circuits and apparatus, protocols, standards, etc. are not described in detail so as not to unnecessarily obscure, occlude or obfuscate the exemplary aspects of the present invention being described.

Portions of the detailed description that follows are presented and discussed in terms of methods, e.g., computer implemented processes. Although blocks and sequencing thereof are disclosed in flowcharts, depicted in various figures herein (e.g., FIGS. 1-3 and 7) describing the operations of these processes (e.g., processes 10, 20, 30 and 70, respectively), such blocks and sequencing are exemplary. Embodiments of the present invention are well suited to performing various other blocks and/or variations of the blocks recited in the flowcharts herein, and in a sequence, order, etc. other than the exemplars depicted and described herein.

In one embodiment, the methods for monitoring a characteristic relating to real-time network health are implemented (e.g., performed) with computer systems. In one embodiment, these computer implemented methods are performed with a computer system under the control of (e.g., programmed with) computer readable code, which in one embodiment is encoded into a computer usable (e.g., readable) medium.

Embodiments of the present invention relate to methods and systems for monitoring a characteristic relating to real-time network health. In one embodiment, a computer implemented method for monitoring a characteristic relating to real-time network health includes detecting a functionality attribute of a service application associated a server of the network. Networking devices of the network are interrogated in relation to an operational status thereof. The real-time network health characteristic is inferred from the functionality attribute and/or the operational status detected.

Therefore, embodiments of the present invention improve the real-time relevance network health monitoring and thus increase the effectiveness thereof. Embodiments of the present invention allow a network management entity such as a network administrator to ascertain whether the network is functioning properly and if not, to identify (e.g., infer) root causes responsible for network failures, slowdowns, efficiency and functionality problems, etc.

In one embodiment, the monitoring of network services comprises a focal function. The network services monitoring function is performed with a network diagnostic function that relates to network operability, availability, connectivity, topology, etc. Thus, embodiments of the present invention allow a network management entity a perspective that advantageously reflects that of the network users.

Further, embodiments of the present invention contrast with possibly more latency prone and/or indirect conventional approaches. Conventional approaches comparatively can involve somewhat intensive processing and analysis of data such as counters and values from myriad network devices. In contrast, embodiments of the present invention monitor the state (e.g., an instantaneous state, snapshot, etc.) of the network in terms of network health and in real-time.

Moreover, embodiments of the present invention allow root causes of network problems, inefficiencies, etc. to be determined using network service monitoring as a starting point. This has the benefit of identifying (e.g., inferring, ascribing, associating, etc.) root causes of network health related characteristics, issues and problems not from the perspective of the network users affected thereby, as well as accurately and precisely in relation to network connectivity and topology characteristics. Embodiments of the present invention thus allow proactive network management correspondingly appropriate thereto. The embodiments described below thus exemplify methods and systems for monitoring a characteristic relating to real-time network health.

Exemplary Processes Relating to Network Health Monitoring

Figure 1:
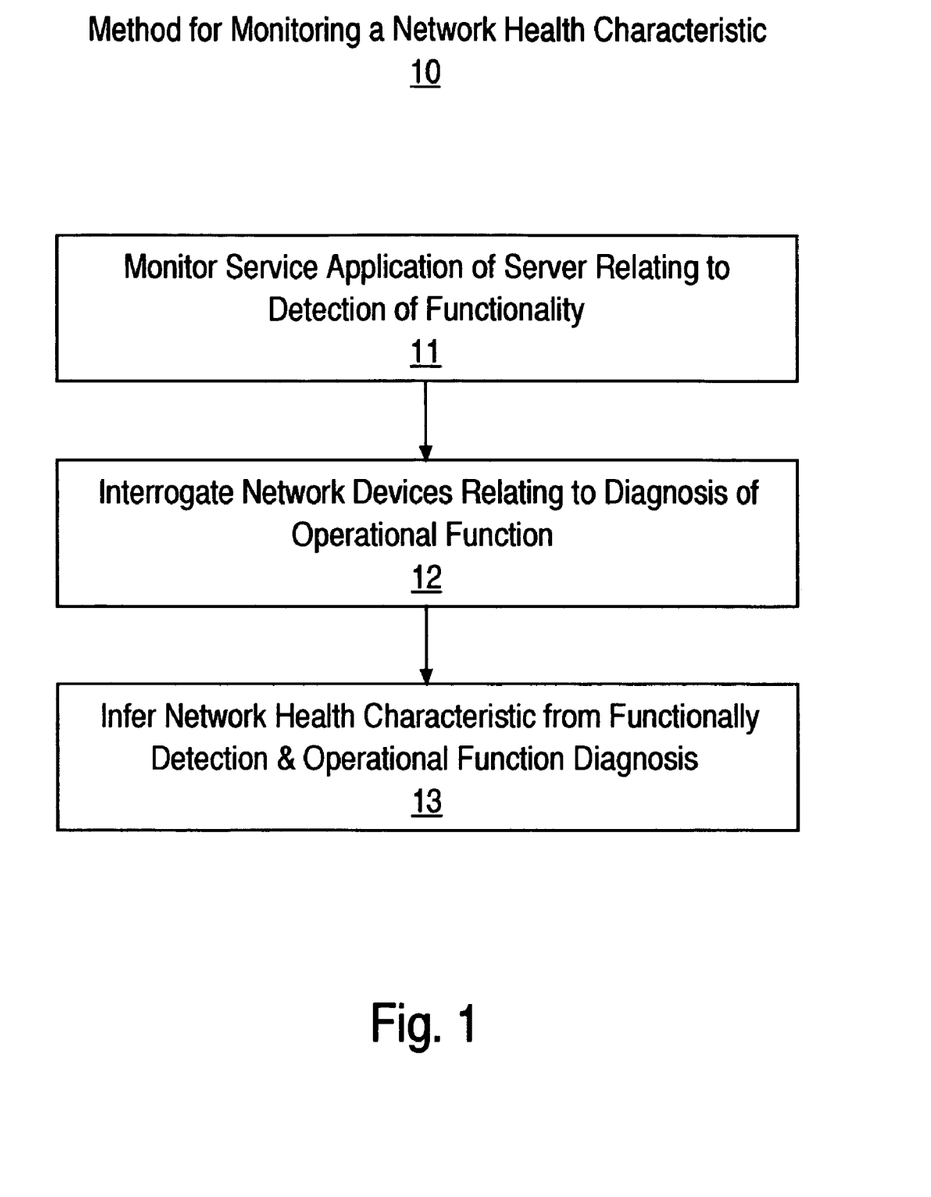
FIG. 1 depicts a flowchart for an exemplary computer implemented process for monitoring a network health characteristic, according to an embodiment of the present invention.

FIG. 1 depicts a flowchart for an exemplary computer implemented process 10 for monitoring a network health characteristic, according to an embodiment of the present invention. Process 10 begins with block 11, wherein a functionality attribute of a network service application is detected. The service application is associated with a server of the network. In one embodiment, detecting the service application functionality attribute includes ascertaining a functional condition of the service application that affects the real-time network health characteristic.

Figure 2:
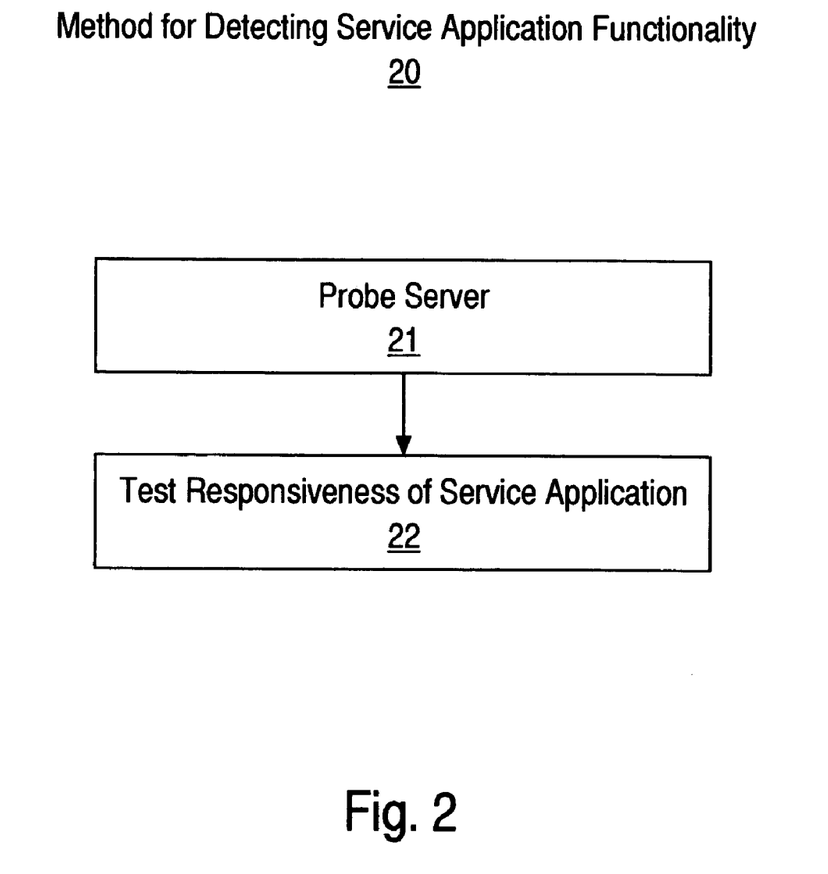
FIG. 2 depicts a flowchart for an exemplary computer implemented process for detecting a functionality attribute of a network service application, according to an embodiment of the present invention.

FIG. 2 depicts a flowchart for an exemplary computer implemented process 20 for detecting a functionality attribute of a network service application, according to an embodiment of the present invention. Process 20 begins with block 21, wherein a server of the network probes the network service. In block 22, upon probing, the server tests the responsiveness of the service application.

Figure 3:
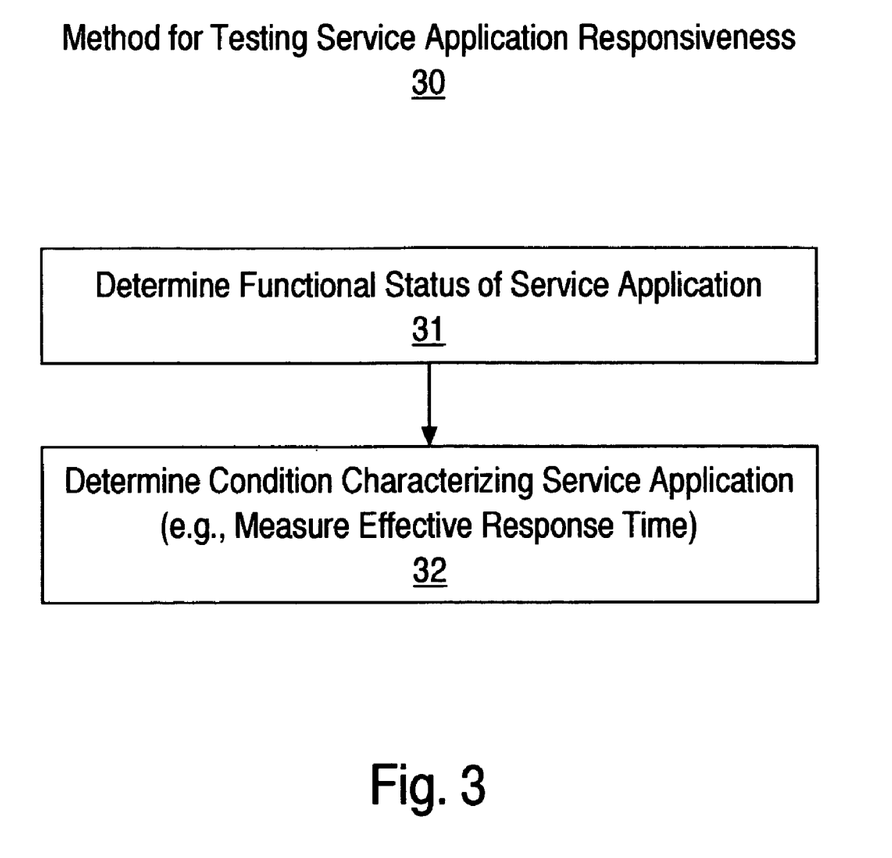
FIG. 3 depicts a flowchart for an exemplary computer implemented process for testing the responsiveness of a network service application, according to an embodiment of the present invention.

FIG. 3 depicts a flowchart for an exemplary computer implemented process 30 for testing the responsiveness of a network service application, according to an embodiment of the present invention. Process 30 begins with block 31, wherein a functional status of the service application, such as its functional availability, is determined. For instance, for a web browser service application, its ability to successfully request and download a web page may be ascertained.

In block 32, a condition characterizing the functionality of the service application is determined. In one embodiment, determining the service application functionality condition includes measuring an effective response time associated with said service application. For instance, for the web browser service application, upon ascertaining its ability to successfully request/download a web page, its effectiveness at doing so may be inferred with a measurement of how long the service application takes to do so.

Referring again to FIG. 1, in block 12, one or more networking devices (e.g., routers, network switches, etc.) are interrogated in relation to an operational status thereof. In one embodiment, interrogating the network devices includes a condition of its operational status that affects a real-time network health characteristic. In one embodiment, the interrogation of the network devices includes pinging the devices.

In one embodiment, the operational status of the network devices includes an operating state of one or more of the network devices such as operational availability, operability of various functions thereof, etc. In one embodiment, the operational status of the network devices includes a connectivity state associated therewith, such as other devices to which they are connected, their port speeds, etc. In one embodiment, the operational status of the network devices includes a topology state characterizing the network.

In block 13, a real-time network health characteristic is inferred. The real-time network health characteristic is inferred on the basis of the functionality attribute detected for the service applications and/or the operational status diagnosed upon interrogating the network devices.

One embodiment of the present invention thus combines functional aspects that include service monitoring and network analysis to infer a characteristic related to network health that can be useful in real-time to a network management entity such as a network administrator. The network management entity thus enjoys real-time knowledge of situations relating to network health, e.g., effectively instantaneously, immediately, etc. as well as accurate, precise diagnostic information pertinent thereto.

Exemplary Systems Related to Network Health Monitoring

Figure 4:
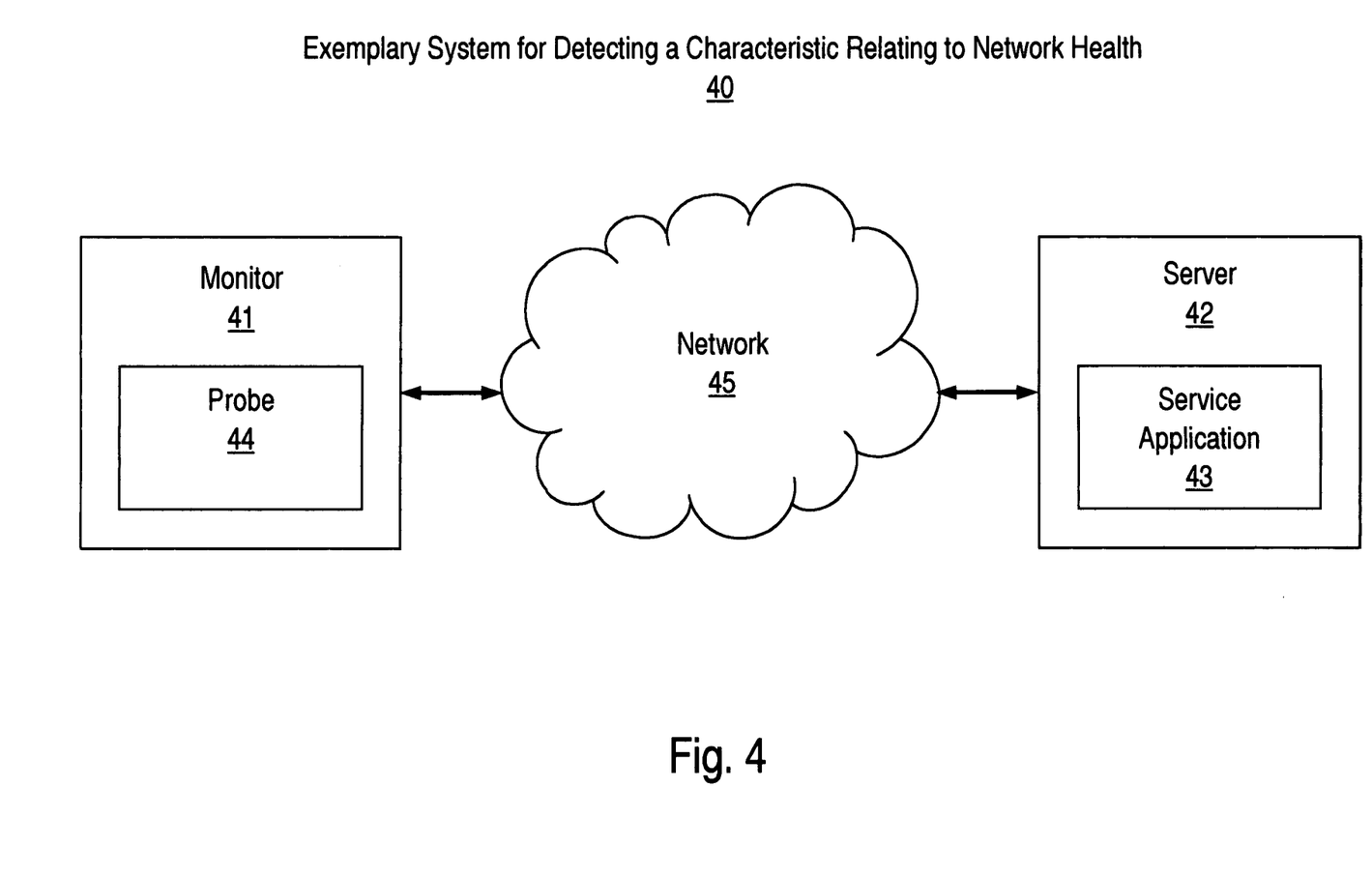
FIG. 4 depicts an exemplary system for detecting a characteristic relating to network health, according to an embodiment of the present invention.

FIG. 4 depicts an exemplary system 40 for detecting a characteristic relating to network health, according to an embodiment of the present invention. System 40 has a monitor 41, which monitors service applications that are running on computers that are connected with a network 45. Monitor 41 has a probe 44, used with server 42. Upon probing the network service, monitor 41 detects a functionality attribute of network service application 43, which is disposed to function therewith.

Figure 5:
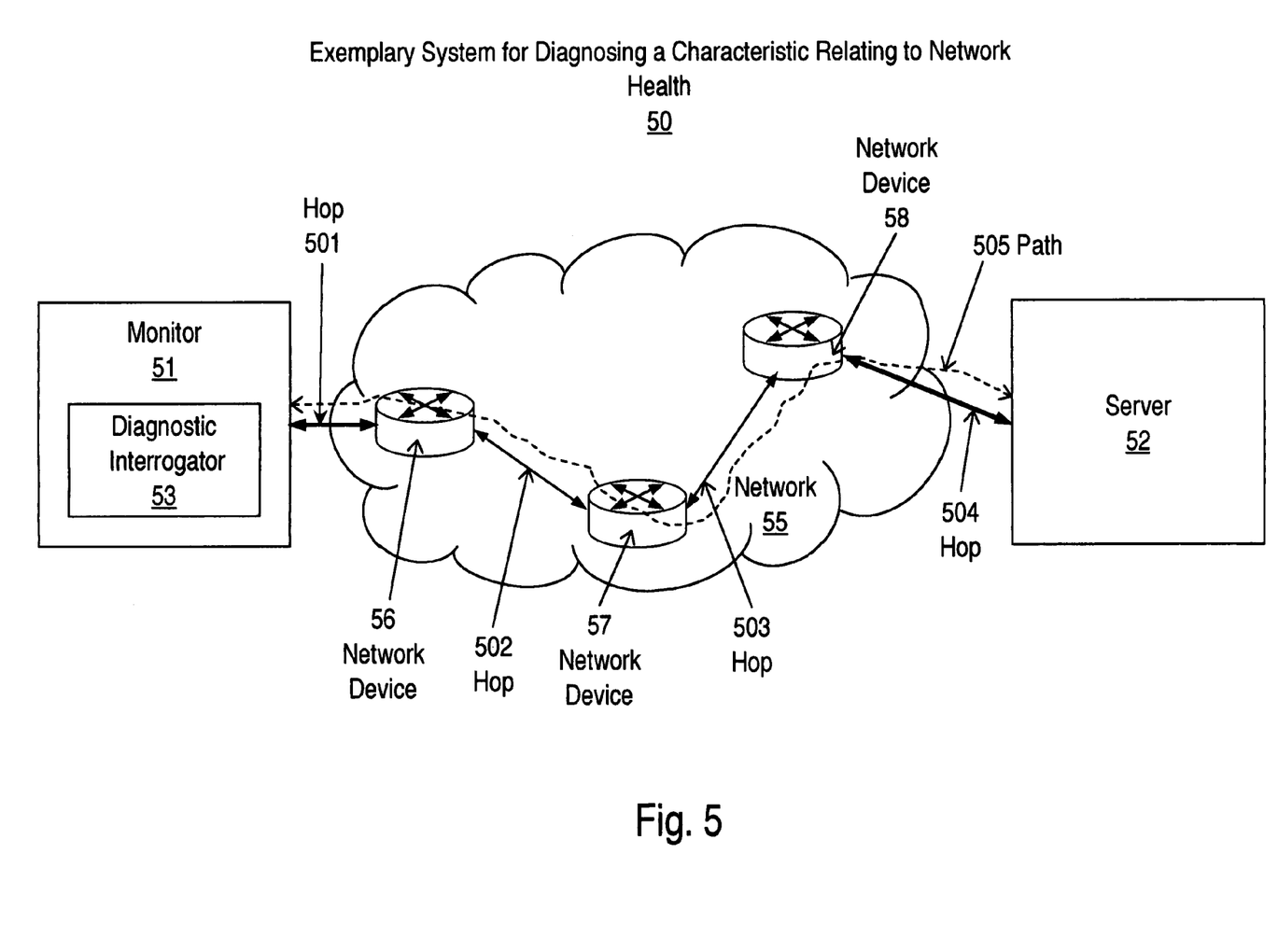
FIG. 5 depicts an exemplary system for diagnosing a characteristic relating to network health, according to an embodiment of the present invention.

FIG. 5 depicts an exemplary system 50 for diagnosing a characteristic relating to network health, according to an embodiment of the present invention. A network 55 has network devices such as routers, network switches, etc. that include devices 56, 57 and 58. System 50 has a monitor 51, which monitors the network devices 56, 57 and 58.

Monitor 51 has an interrogator 53, which interrogates network devices 56, 57 and 58 in relation to their operational status, e.g., as to a condition thereof that affects a real-time health characteristic of network 55. In one embodiment, the interrogation of network devices 56, 57 and 58 includes pinging them.

In one embodiment, the operational status of the network devices 56, 57 and 58 includes an operating state thereof such as operational availability, operability of various functions thereof, etc. In one embodiment, the operational status of network devices 56, 57 and 58 includes a connectivity state associated therewith, such as other devices to which they are connected, their respective port speeds, etc. In one embodiment, the operational status of network devices 56, 57 and 58 includes a topology state characterizing network 55.

In one embodiment, monitor 51 is coupled to (e.g., connected with, networked with, etc.) server 52 via a path 505, which includes the network devices 56, 57 and 58. Thus, a function performed by a service application (e.g., service application 43; FIG. 4) accessed with server 52 traverses path 505, to be detected by monitor 51.

Path 505 is comprised of multiple segments (e.g., hops) 501-504. Hop 501 extends (e.g., runs) from (e.g., includes, between, etc.) monitor 51 to network device 56. Hop 502 runs from network device 56 to network device 57. Hop 503 runs from network device 57 to network device 58. Hop 504 runs from network device 58 to server 52.

Figure 6:
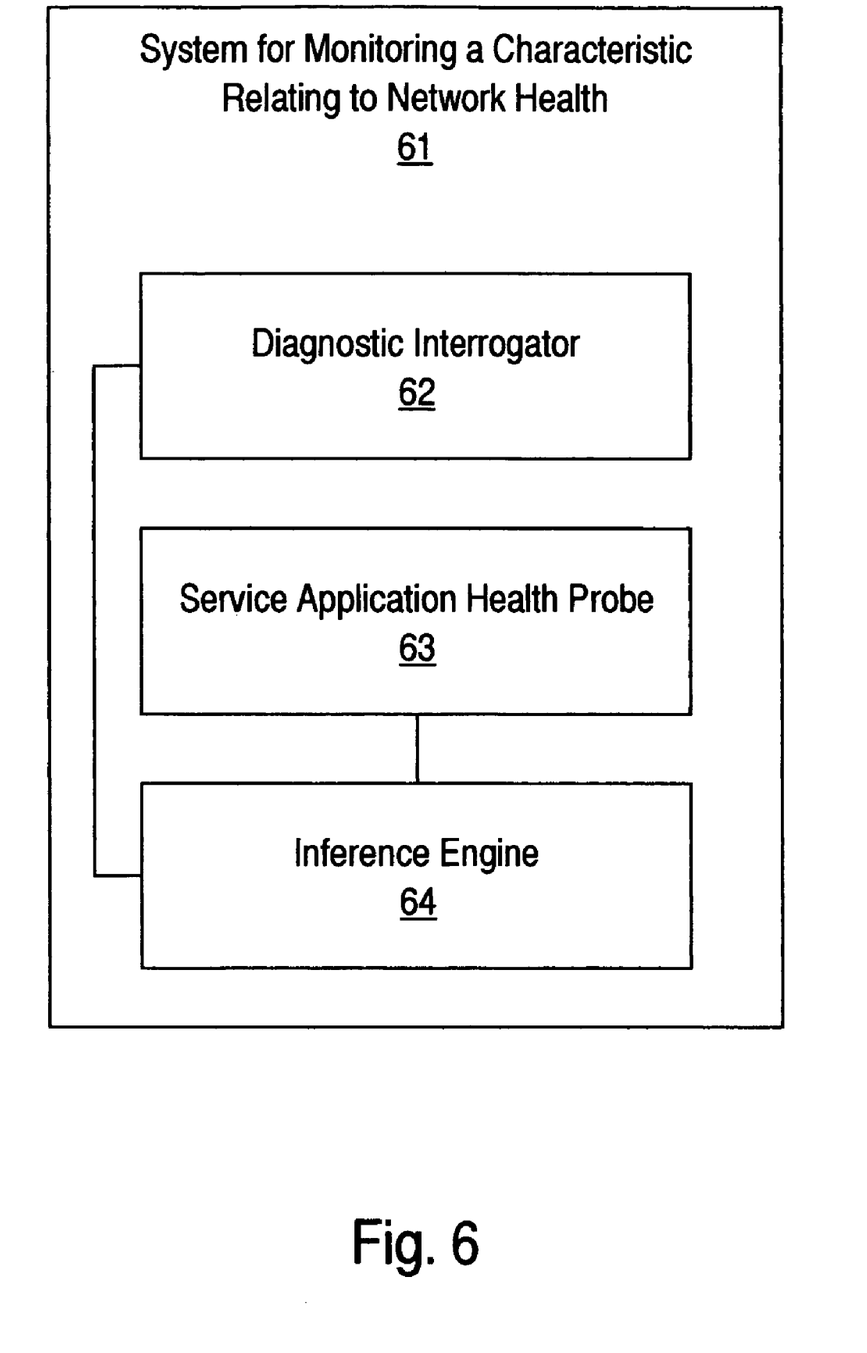
FIG. 6 depicts an exemplary computer based system for monitoring a network health characteristic, according to an embodiment of the present invention.

FIG. 6 depicts an exemplary computer based system 60 for monitoring a network health characteristic, according to an embodiment of the present invention. System 60 monitors a characteristic relating to real-time health of a network. In one embodiment, system 60 is disposed, deployed, etc. for use related to networks such as those depicted in FIGS. 4 and/or 5.

System 60 has a service application health probe (e.g., service detector) 63. Service detector 63 probes a server of the network and monitors (e.g., detects) a service application functionality attribute associated therewith. In one embodiment, service detector 63 includes functionality associated with a network services monitoring application.

System 60 has a diagnostic device interrogator 62 that functions with the service detector 63. Device interrogator 62 interrogates one or more of the network's networking devices (e.g., routers, network switches, etc.) to monitor an operational status associated therewith. In one embodiment, service detector 63 includes functionality associated with a network management application.

System 60 has an inference engine 64 that functions with service detector 63 and said device interrogator 62. Inference engine 64 determines the nature of a real-time network health characteristic based on the service application functionality attribute and/or the operational status.

In one embodiment, the monitoring includes ascertaining a functional status of the service application. The functional status is associated, in one embodiment, with operational availability of said service application. Upon ascertaining that a service application is functional (e.g., operationally available), a condition characterizing the service application is determined, such as its efficiency of functionality. In one embodiment, the service application's condition is related to (e.g., reflected by, dependent on, etc.) an effective response time associated with said service application.

In one embodiment, the operational function of the networking devices includes an operating state of one or more thereof. In one embodiment, the operational function of the networking devices includes a connectivity state associated with the network devices. In one embodiment, the operational function of the networking devices includes a topology characteristic of the network.

One embodiment of the present invention thus combines functional aspects that include service monitoring and network analysis to infer a characteristic related to network health that can be useful in real-time to a network management entity. The network management entity thus enjoys real-time knowledge of situations relating to network health, e.g., effectively instantaneously, immediately, etc. as well as accurate, precise diagnostic information pertinent thereto.

For instance, service application health probe 63 effectively functions as a service monitor that tracks the current status of network services accessible with servers of the network that are useful (e.g., valuable) to network users and thus interesting to the network management entity. Information relating to network health characteristics includes the availability of a network service, such as whether it is "up" or "down," and the response time associated with the network service. Under "normal" conditions, network health characteristics are within a predefined acceptable range, which implies that no network health problems then exist that could trouble users.

One embodiment uses information relating to network topology and states, connectivities, etc. associated with devices thereof. Thus, where a network health characteristic indicates (e.g., implies, etc.) that a real-time issue related to network health exists, the present embodiment informs a network management entity and takes information related to a location associated with (e.g., corresponding to) the network service such as where it attaches (e.g., couples, connects, interconnects, etc.) to the network and begins processing thereof to analyze information relating to network devices involved in accessing the network service. Additionally, the network path between the network service (e.g., a deployment point thereof such as a server) and the network location of monitor system 61 and/or another (e.g., arbitrarily) designated endpoint is analyzed for anomalies.

Exemplary Process Relating to Network Health Diagnosis

Figure 7:
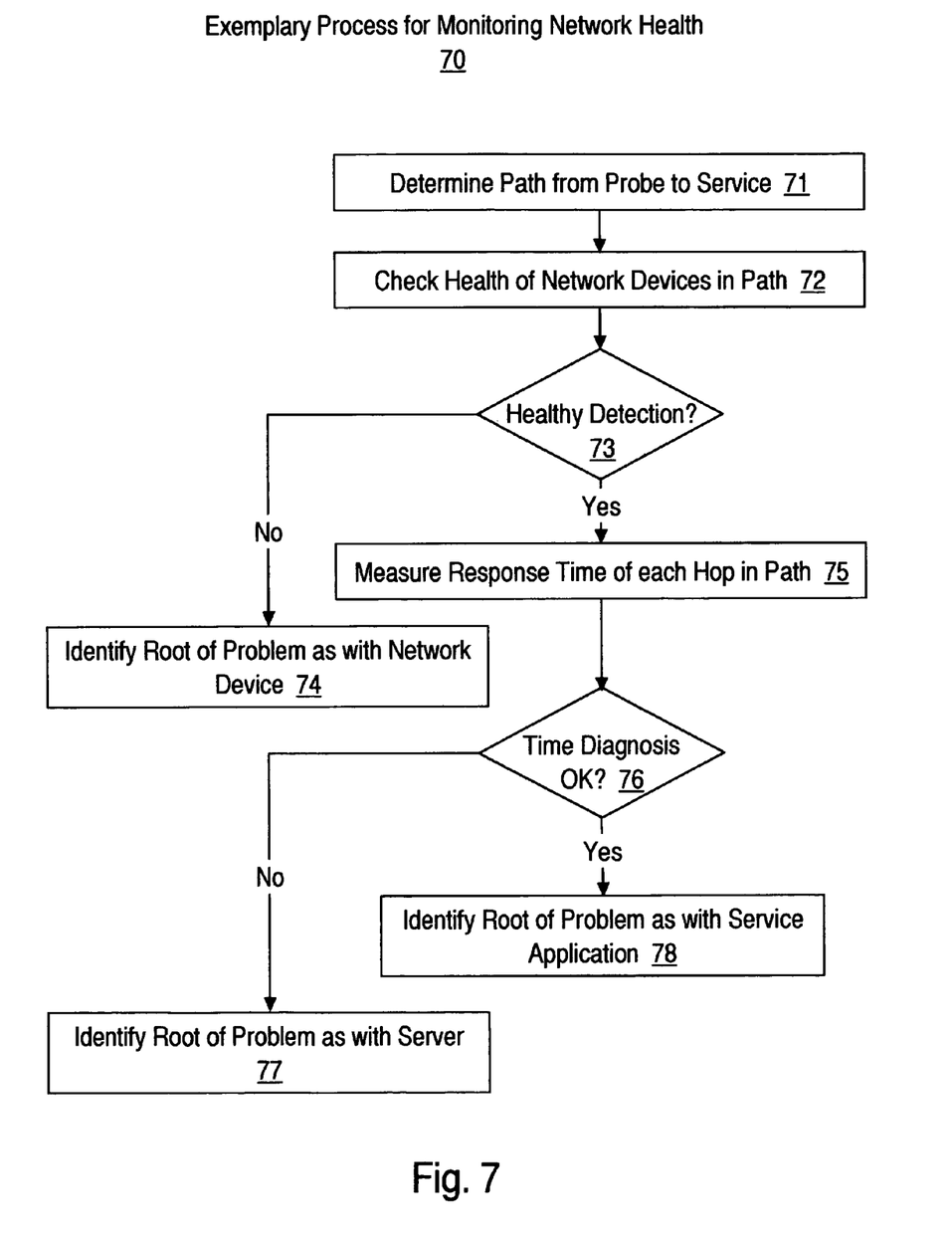
FIG. 7 depicts an exemplary computer implemented process for diagnosing an other than optimal health condition of a network, according to an embodiment of the present invention.

FIG. 7 depicts an exemplary computer implemented process 70 for diagnosing an other than optimal health condition of a network, according to an embodiment of the present invention. Process 70 begins with block 71 wherein a path in the network is determined from a server thereof to a probe remote therefrom. The path has one or more segments (e.g., hops) that are terminated at opposing ends thereof with one of the network's multiple networking devices (e.g., routers, network switches, etc.).

In block 72, the functional health of the networking devices is checked. In one embodiment, the checking is performed with an interrogation of the network devices, e.g., with pinging and/or other techniques. In one embodiment, the functional health comprises a characteristic of the network devices relating to an operating state of the network devices such as their operational availability. In one embodiment, the functional health comprises a characteristic of the network devices relating to a connectivity state associated with the network devices, such as which of their ports are functionally active and the speeds thereof, which other network devices they are connected to, etc. In one embodiment, the functional health comprises a characteristic of the network devices relating to a topological characteristic of the network.

In decision block 73, it is determined whether the functional health check has a satisfactory result. Where the functional health check result is other than satisfactory, in block 74 an inference is drawn wherein the root cause associated with the other than optimal real-time network health condition is identified as related to (e.g., rooted in) the network devices having the other than satisfactory functional health check results.

Where the functional health check yields satisfactory results, in block 75, the response time of each hop in the path is measured, which effectively performs a time based diagnostic test. In one embodiment, the time measurement includes probing the server to test the service application. In decision block 76, it is determined whether the time based diagnosis has a satisfactory result.

Where the response time for a segment is other than satisfactory, in block 77 an inference is drawn wherein the root cause associated with the other than optimal real-time network health condition is identified as related to (e.g., rooted in) the server at the end of the path under test. Where the time diagnosis yields satisfactory results for each hop, in block 78 an inference is drawn wherein the root cause associated with the other than optimal real-time network health condition is identified as related to (e.g., rooted in) the service application.

Thus, an embodiment of the present invention monitors a characteristic related to network health effectively constantly and in real-time using real (e.g., timely, current, live, real-time, etc.) data from network services that are actually used (e.g., actively utilized) by network users. Potential problems detected by the network services monitor is analyzed in the light of real-time network topological, path, connectivity and/or related information to accurately, precisely diagnose, e.g., infer the identify of, its root cause.

Embodiments of the present invention, methods and systems for monitoring a characteristic relating to real-time network health, are thus described. While the present invention has been described in particular exemplary embodiments, it should be appreciated that the present invention should not be construed as limited by such embodiments, but rather construed according to the following claims.

What is claimed is:

1. A computer implemented method for monitoring a characteristic relating to real-time health of a network, comprising:
    detecting through a path in said network a functionality attribute of a service application accessed with a server of said network, said path comprising one or more segments that are terminated at opposing ends thereof with one of a plurality of networking devices of said network;
    interrogating one or more of said networking devices of said network in relation to an operational status thereof;
    upon said interrogating wherein said operational status comprises a satisfactory result, measuring a response time associated with each segment; and
    inferring said real-time network health characteristic from one or more of said functionality attribute, said operational status, and said measuring.

2. The method as recited in claim 1 wherein said detecting comprises:
    probing with said server; and
    testing at least one of the responsiveness and availability of said service application therefrom.

3. The method as recited in claim 2 wherein said testing comprises:
    determining a functional status of said service application; and
    upon said determining wherein said functional status is associated with operational availability of said service application, further determining a condition characterizing said service application.

4. The method as recited in claim 3 wherein said determining a condition comprises measuring an effective response time associated with said service application.

5. The method as recited in claim 1 wherein said operational status of said networking devices comprises one or more of:
    an operating state of one or more devices associated with said network;
    a connectivity state associated with said network devices; and
    a topology state characterizing said network.

6. The method as recited in claim 1 wherein said detecting comprises ascertaining a functional condition of said service application that affects said real-time network health characteristic.

7. The method as recited in claim 1 wherein interrogating comprises diagnosing a condition of said operational status that affects said real-time network health characteristic.

8. A system for monitoring a characteristic relating to real-time health of a network, said system comprising:
    a computer system under the control of computer readable code, the code including computer readable instructions for controlling:
        a service detector probe for a server of said network that monitors a service application functionality attribute accessed therewith through a path in said network, said path comprising one or more segments that are terminated at opposing ends thereof with one of a plurality of networking devices of said network;
        a device interrogator functional with said service detector that interrogates one or more of said networking devices of said network to monitor an operational status associated therewith, upon said interrogation wherein said operational status comprises a satisfactory result, measuring a response time associated with each segment; and
        an inference engine functional with said service detector and said device interrogator that determines said real-time network health based on one or more of said service application functionality attribute, said operational status, and said measuring.

9. The system as recited in claim 8 wherein said monitoring comprises:

determining a functional status of said service application; and upon said determining wherein said functional status is associated with operational availability of said service application, further determining a condition characterizing said service application.

10. The system as recited in claim 9 wherein said condition comprises an effective response time associated with said service application.

11. The system as recited in claim 8 wherein said operational function of said networking devices comprises one or more of:

an operating state of one or more devices associated with said network;

a connectivity state associated with said network devices; and a topology characterizing said network.

12. The system as recited in claim 8 wherein said service detector comprises a network services monitoring application.

13. The system as recited in claim 8 wherein said device interrogator comprises a network management application.

14. A computer implemented method for diagnosing an other than optimal health condition of a network, comprising:

determining a path in said network from a server to a probe remote therefrom wherein said path comprises one or more segments that are terminated at opposing ends thereof with one of a plurality of devices of said network;

checking the functional health of one or more of said network devices;

upon said checking wherein said functional health comprises a satisfactory result, measuring a response time associated with each segment; and inferring a root cause associated with said other than optimal network health condition in real-time based on one or more of said checking and said measuring.

15. The method as recited in claim 14 wherein said inferring comprises, upon said checking wherein said functional health comprises other than a satisfactory result for one or more of said network devices, associating said root cause with said other than satisfactory network devices.

16. The method as recited in claim 14 wherein said inferring comprises, upon said measuring wherein said response time is acceptable for each said segment, associating said root cause with a service application disposed within said server.

17. The method as recited in claim 16 wherein said measuring comprises probing with server to test said service application.

18. The method as recited in claim 14 wherein said inferring comprises, upon said measuring wherein said response time is other than acceptable for one or more of said segments, associating said root cause with said server.

19. The method as recited in claim 14 wherein said checking comprises interrogating said network devices.

20. The method as recited in claim 19 wherein said functional health comprises a characteristic of said network devices relating to one or more of:

an operating state of one or more of said network devices;

a connectivity state associated with said network devices; and a topology characterizing said network.

* * * * *